R. MACDONALD.
MEASURING DEVICE FOR SEED-HEATERS.
No. 193,168. Patented July 17, 1877.
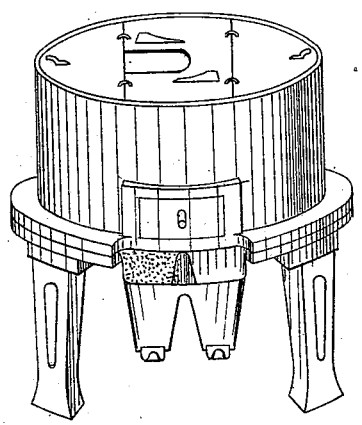
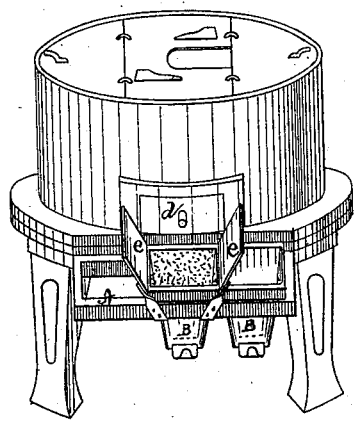
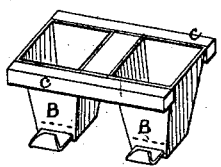

UNITED STATES PATENT OFFICE.

RICHARD MACDONALD, OF NEW ORLEANS, LOUISIANA.

IMPROVEMENT IN MEASURING DEVICES FOR SEED-HEATERS.

Specification forming part of Letters Patent No. 193,168, dated July 17, 1877; application filed May 8, 1877.

*To all whom it may concern:*

Be it known that I, RICHARD MACDONALD, a resident of the city of New Orleans, parish of Orleans, and State of Louisiana, have invented a certain new and useful Improvement in Seed-Heaters; and I do hereby declare the following to be a full, clear, and correct description of the same, reference being had to the annexed drawing, making a part of this specification.

This invention relates to that class of heaters in which cotton, flax, and other seeds are subjected to high degrees of temperature in order that the oil contained in the same may be readily and effectively expressed.

In the accompanying drawing, Figure 1 represents a heater of ordinary construction; Fig. 2, a heater provided with my improvement, and Fig. 3 a perspective view of my measuring apparatus as when removed from its supporting-frame and scrapers.

The object of my invention is to provide for the even measurement of the seed withdrawn from heaters, so that the presses may be less liable to break, while, at the same time, a much greater quantity of oil may be obtained and a more uniform size and weight of cake be produced.

An objection to the present mode of filling the measures is, that owing to the stirrers moving in but one direction, the seed is carried beyond the dividing-plate, so that virtually but one measure is of any use.

In the application of my improvement I secure to the front of the stand, in lieu of the ordinary measures, an open rectangular frame, A, and fit therein a pair of measures, B, the side supports *c* of which rest on the upper edges of the aforesaid frame, so that the measures may operate back and forth therein.

To the frame A is secured, on each side of the heater-door *d*, two inclined plates or hopper sides, *e e'*, the lower edges of which are very nearly on a level with the top of the measures, so that as the latter are moved endwise in the frame the seed may be scraped evenly over the top of the same, hence securing a regular charge, and permitting one measure to be filled while the other is being emptied, thus enabling the attendant to accomplish more work with better results than is at present attainable.

All kinds of seeds from which oil is expressed can be correctly measured by having one or more slide-openings in the front of the measures, so that the same may be increased or decreased in size, according to the weight of the seed to be treated, the slide being fitted in the upper opening for the heavy, and in the lower one for the lighter, seed.

From the above description it is evident that the pressmen can no longer neglect their duty, as a careful noting of the operation of this invention for one or more hours will give the measure of a day's work for the presses, and as a given number of pressures per day must give the same yield of oil, having received the same amount of seed, it follows that if the yield of oil does not correspond the pressmen have neglected their duties.

Heretofore no correct measure of a pressman's work could be made, as one heaterman might be drawing heavy cakes and the other light ones; thus there might be a difference between them in one day's work of some fifty gallons of oil. With my improvement no such result is possible.

Having described my invention, what I claim as new, and desire to secure by Letters Patent, is—

As an improvement in seed-heaters, the measuring apparatus herein described, the same consisting of a frame, A, for the support of the measures B, the latter so arranged as to slide back and forth beneath the hopper sides or scrapers *e*, for the purpose set forth.

In testimony whereof I have hereunto set my hand.

RICHARD MACDONALD.

In presence of—
JAMES BOYD,
J. C. HUBBELL.